(12) United States Patent
Jin et al.

(10) Patent No.: US 10,244,455 B2
(45) Date of Patent: Mar. 26, 2019

(54) MOBILITY MANAGEMENT PROCEDURE INITIATION METHOD AND DEVICE

(71) Applicant: HUAWEI TECHNOLOGIES CO., LTD., Shenzhen, Guangdong (CN)

(72) Inventors: Hui Jin, Beijing (CN); Li Shen, Beijing (CN); Bei Dai, Wuhan (CN); Yinqing Jiang, Wuhan (CN); Xiaoyan Duan, Beijing (CN); Xiaoguang Wu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/507,746

(22) PCT Filed: Aug. 29, 2014

(86) PCT No.: PCT/CN2014/085594
§ 371 (c)(1),
(2) Date: Feb. 28, 2017

(87) PCT Pub. No.: WO2016/029458
PCT Pub. Date: Mar. 3, 2016

(65) Prior Publication Data
US 2017/0311220 A1    Oct. 26, 2017

(51) Int. Cl.
*H04W 4/00* (2018.01)
*H04W 36/30* (2009.01)
(Continued)

(52) U.S. Cl.
CPC .......... *H04W 36/30* (2013.01); *H04W 24/04* (2013.01); *H04W 36/0055* (2013.01);
(Continued)

(58) Field of Classification Search
CPC ..... H04W 24/02; H04W 24/04; H04W 28/02; H04W 28/0226; H04W 36/0055;
(Continued)

(56) References Cited

U.S. PATENT DOCUMENTS 8,295,165 B2 * 10/2012 Jung ................ H04W 76/19
370/225
8,787,337 B2 * 7/2014 Jain ................. H04B 17/318
370/338
(Continued)

FOREIGN PATENT DOCUMENTS

CN        1902976 A      1/2007
CN      101888684 A     11/2010
(Continued)

OTHER PUBLICATIONS

3GPP TS 24.008 V12.6.0 (Jun. 2014),"3rd Generation Partnership Project;Technical Specification Group Core Network and Terminals; Mobile radio interface Layer 3 specification;Core network protocols; Stage 3(Release 12)", XP50774200A, total 698 pages.
(Continued)

*Primary Examiner* — Frank Duong
(74) *Attorney, Agent, or Firm* — Fish & Richardson P.C.

(57) ABSTRACT

Embodiments of the present disclosure disclose a mobility management procedure initiation method and a device, where the method may include: when a quantity N of failures of a mobility management procedure initiated by a device to a core network entity is greater than or equal to a first threshold, determining, by the device, whether N pieces of failure information include first information used to indicate a failure in establishing a radio resource control protocol connection; when the device determines that the N pieces of failure information include the first information, setting, by the device, an initiation condition parameter for initiating the mobility management procedure; and initiat-
(Continued)

ing, by the device, the mobility management procedure based on the initiation condition parameter. The present disclosure can improve a network access speed of the device.

12 Claims, 5 Drawing Sheets

(51) Int. Cl.
*H04W 24/04* (2009.01)
*H04W 88/02* (2009.01)
*H04W 36/00* (2009.01)
*H04W 36/16* (2009.01)
*H04W 24/02* (2009.01)
*H04W 28/02* (2009.01)
*H04W 60/04* (2009.01)
*H04W 60/00* (2009.01)

(52) U.S. Cl.
CPC ..... *H04W 36/0083* (2013.01); *H04W 36/165* (2013.01); *H04W 88/02* (2013.01); *H04W 24/02* (2013.01); *H04W 28/0226* (2013.01); *H04W 60/00* (2013.01); *H04W 60/04* (2013.01)

(58) Field of Classification Search
CPC ........... H04W 36/0083; H04W 36/165; H04W 36/30; H04W 60/04; H04W 76/02; H04W 76/027; H04W 76/18; H04W 88/02
See application file for complete search history.

(56) References Cited

U.S. PATENT DOCUMENTS

| | | | | |
|---|---|---|---|---|
| 8,838,089 B2* | 9/2014 | Wu | ...................... | H04W 76/18 455/423 |
| 8,934,334 B2* | 1/2015 | Kim | ..................... | H04W 24/04 370/216 |
| 9,326,311 B2* | 4/2016 | Wirtanen | ............. | H04W 48/06 |
| 9,516,689 B2* | 12/2016 | Kiss | ...................... | H04W 76/18 |
| 9,860,834 B2* | 1/2018 | Kim | ...................... | H04W 8/065 |
| 2005/0227719 A1 | 10/2005 | Gunaratnam et al. | | |
| 2007/0037577 A1 | 2/2007 | Dalsgaard et al. | | |
| 2012/0178449 A1 | 7/2012 | Liao | | |
| 2012/0178457 A1 | 7/2012 | Liao | | |
| 2012/0329442 A1* | 12/2012 | Luft | .................. | H04W 74/0833 455/418 |
| 2013/0003699 A1 | 1/2013 | Liu et al. | | |
| 2013/0100795 A1* | 4/2013 | Zhao | ................. | H04W 36/0016 370/216 |
| 2014/0106738 A1 | 4/2014 | Ostrup et al. | | |
| 2014/0148174 A1 | 5/2014 | Teyeb et al. | | |
| 2014/0153408 A1 | 6/2014 | Jun et al. | | |
| 2016/0150496 A1* | 5/2016 | Kim | .................. | H04W 28/0226 455/435.1 |

FOREIGN PATENT DOCUMENTS

| | | |
|---|---|---|
| CN | 102045875 A | 5/2011 |
| CN | 102223658 A | 10/2011 |
| CN | 102595638 A | 7/2012 |
| CN | 103597869 A | 2/2014 |
| CN | 103797846 A | 5/2014 |
| CN | 103959842 A | 7/2014 |
| EP | 2827645 A1 | 1/2015 |
| JP | 2009505547 A | 2/2009 |
| JP | 2012147436 A | 8/2012 |
| JP | 2014135781 A | 7/2014 |
| JP | 2014518493 A | 7/2014 |
| WO | 2013137698 A1 | 9/2013 |
| WO | 2013167802 A1 | 11/2013 |
| WO | 2013170211 A1 | 11/2013 |

OTHER PUBLICATIONS

3GPP TS 45.008 V12.3.0 (Feb. 2014), "3rd Generation Partnership Project;Technical Specification Group GSM/EDGE Radio Access Network;Radio subsystem link control(Release 12)", TS 45.008, dated Feb. 2014,total 153 pages.

3GPP TS 25.331 V12.2.0 (Jun. 2014),3rd Generation Partnership Project;Technical Specification Group Radio Access Network;Radio Resource Control (RRC);Protocol specification(Release 12),TS 25.331, dated Jun. 2014,total 2139 pages.

R2-131266 NTT Docomo, Inc., "RACH transmission Failure issue", 3GPP TSG-RAN WG2#81 bis, Apr. 15, 2013, total 5 pages.

Japanese Office Action (Notice of Reasons for Rejection) issued in Japanese Application No. 273569 dated Jul. 3, 2018, 8 pages.

* cited by examiner

MOBILITY MANAGEMENT PROCEDURE INITIATION METHOD AND DEVICE

CROSS REFERENCE TO RELATED APPLICATIONS

This application is a National Stage of International Application No. PCT/CN2014/085594, filed on Aug. 29, 2014, which is hereby incorporated by reference in its entirety.

TECHNICAL FIELD

The present invention relates to the communications field, and in particular, to a mobility management procedure initiation method and a device.

BACKGROUND

In a current radio mobile communications network, when user equipment (English full name: User Equipment, English acronym: UE) is in an idle (English: idle) state, the user equipment generally initiates a mobility management procedure (for example, the user equipment needs to initiate an attach (English: attach) procedure or a tracking area update (English full name: Tracking Area Update, English acronym: TAU) procedure) to request to access the network. The initiating a mobility management procedure may include the following steps:

The UE establishes a radio resource control protocol (English full name: Radio Resource Control, English acronym: RRC) connection to a base station. After the RRC connection is established, the UE sends a mobility management request (for example, an attach request or a TAU request) to a core network entity by using the base station. The core network entity responds to the mobility management request, so that the UE can access the network. The core network entity herein may be a mobility management entity (English full name: Mobility Management Entity, English acronym: MME), a serving GPRS node (English full name: Serving GPRS SUPPORT Node, English acronym: SGSN), or a mobile switching center (English full name: Mobility Switch Center, English acronym: MSC).

In practical application, a failure case may exist in the foregoing mobility management procedure initiated by the UE to the core network entity by using the base station, and after the procedure fails, the UE may continue to initiate the foregoing mobility management procedure. However, when a quantity of continuous failures exceeds a specific threshold (for example five failures), the UE may start a preset timer. When the timer exceeds preset duration, the UE continues to initiate the foregoing mobility management procedure. Currently, the preset duration of the timer in the UE is usually relatively long. For example, preset duration of a timer T3402 of some UEs that use a 4G network is 12 minutes, and preset duration of a timer T3302 of some UEs that use a 2G or 3G network is also 12 minutes.

It can be learned that, in the foregoing technology, when a quantity of continuous failures of a mobility management procedure initiated by UE exceeds a specific threshold, the UE needs to wait for a relatively long time before the UE can initiate the mobility management procedure again, which leads to an extremely low network access speed of the UE.

SUMMARY

The present invention provides a mobility management procedure initiation method and a device, so that a network access speed of the device can be improved.

According to a first aspect, the present invention provides a mobility management procedure initiation method, including:

when a quantity N of failures of a mobility management procedure initiated by a device to a core network entity is greater than or equal to a first threshold, determining, by the device, whether N pieces of failure information include first information used to indicate a failure in establishing a radio resource control protocol connection, where the first threshold is an integer greater than 0, N is an integer greater than 0, and the N pieces of failure information are failure information obtained from the N failures of the mobility management procedure initiated by the device to the core network entity;

when the device determines that the N pieces of failure information include the first information, setting, by the device, an initiation condition parameter for initiating the mobility management procedure; and initiating, by the device, the mobility management procedure based on the initiation condition parameter.

In a first possible implementation manner of the first aspect, the determining, by the device, whether N pieces of failure information include first information used to indicate a failure in establishing a radio resource control protocol connection includes:

determining, by the device, whether a quantity of first information included in the N pieces of failure information is greater than or equal to a second threshold, where the second threshold is a positive integer that is not greater than the first threshold; or determining, by the device, whether the last piece of failure information of the N pieces of failure information is the first information.

With reference to the first aspect or the first possible implementation manner of the first aspect, the setting, by the device, an initiation condition parameter for initiating the mobility management procedure includes:

adjusting, by the device, preset duration of a timer to first duration shorter than the preset duration, where the timer is used to be started when the quantity N of failures of the initiated mobility management procedure is greater than or equal to the first threshold; and the initiating, by the device, the mobility management procedure based on the initiation condition parameter includes:

initiating, by the device, the mobility management procedure when the timer exceeds the first duration.

With reference to the second possible implementation manner of the first aspect, in a third possible implementation manner of the first aspect, before the adjusting, by the device, preset duration of a timer to first duration shorter than the preset duration, the method further includes:

when the device determines that the N pieces of failure information include the first information, determining whether a mobility management area to which all cells currently detected by listening belong is the same as a mobility management area in which the device is currently registered; and if yes, triggering the step of adjusting, by the device, preset duration of a timer to first duration shorter than the preset duration; or when the device determines that the N pieces of failure information include the first information, determining whether a mobility management area to which all cells currently detected by listening belong is in a list of mobility management areas in which the device is currently registered; and if yes, triggering the step of adjusting, by the device, preset duration of a timer to first duration shorter than the preset duration.

With reference to the first aspect or the first possible implementation manner of the first aspect, in a fourth possible implementation manner of the first aspect, the setting, by the device, an initiation condition parameter for initiating the mobility management procedure includes:

setting, by the device, an initiation condition parameter that is used to forbid initiation of the mobility management procedure in a first mobility management area in which the device is currently registered; or setting, by the device, an initiation condition parameter that is used to forbid initiation of the mobility management procedure in a mobility management area in a list of mobility management areas in which the device is currently registered; and the initiating, by the device, the mobility management procedure based on the initiation condition parameter includes:

performing, by the device, a cell reselection procedure according to the initiation condition parameter, and initiating the mobility management procedure to the core network entity when the device selects a cell that belongs to a second mobility management area, where the second mobility management area is a mobility management area in which initiation of the mobility management procedure is not forbidden.

With reference to the fourth possible implementation manner of the first aspect, in a fifth possible implementation manner of the first aspect, the setting, by the device, an initiation condition parameter that is used to forbid initiation of the mobility management procedure in a first mobility management area in which the device is currently registered includes:

determining, by the device, whether a target cell exists in a cell currently detected by listening, where a mobility management area to which the target cell belongs is not the first mobility management area, and the target cell meets a cell selection condition; and if yes, setting the initiation condition parameter that is used to forbid the initiation of the mobility management procedure in the first mobility management area.

With reference to the fourth possible implementation manner of the first aspect, in a sixth possible implementation manner of the first aspect, the setting, by the device, an initiation condition parameter that is used to forbid initiation of the mobility management procedure in a mobility management area in a list of mobility management areas in which the device is currently registered includes:

determining, by the device, whether a target cell exists in a cell currently detected by listening, where a mobility management area to which the target cell belongs is not in the list of mobility management areas in which the device is currently registered, and the target cell meets a cell selection condition; and if yes, setting the initiation condition parameter that is used to forbid the initiation of the mobility management procedure in the mobility management area in the list of mobility management areas.

With reference to the first aspect or the first possible implementation manner of the first aspect, in a seventh possible implementation manner of the first aspect, the setting, by the device, an initiation condition parameter for initiating the mobility management procedure includes:

adjusting, by the device, preset duration of a timer to first duration shorter than the preset duration, and setting an initiation condition parameter that is used to forbid initiation of the mobility management procedure in a first mobility management area in which the device is currently registered, where the timer is used to be started when the quantity N of failures of the initiated mobility management procedure is greater than or equal to the first threshold; or adjusting, by the device, preset duration of a timer to first duration shorter than the preset duration, and setting an initiation condition parameter that is used to forbid initiation of the mobility management procedure in a mobility management area in a list of mobility management areas in which the device is currently registered, where the timer is used to be started when the quantity N of failures of the initiated mobility management procedure is greater than or equal to the first threshold; and the initiating, by the device, the mobility management procedure based on the initiation condition parameter includes:

performing, by the device, a cell reselection procedure according to the initiation condition parameter; and when the device selects a cell that belongs to a second mobility management area, stopping, by the device, the timer, and initiating the mobility management procedure to the core network entity, where the second mobility management area is a mobility management area in which initiation of the mobility management procedure is not forbidden.

With reference to the fourth possible implementation manner of the first aspect or the fifth possible implementation manner of the first aspect or the sixth possible implementation manner of the first aspect or the seventh possible implementation manner of the first aspect, in an eighth possible implementation manner of the first aspect, the setting, by the device, an initiation condition parameter that is used to forbid initiation of the mobility management procedure in a first mobility management area in which the device is currently registered includes:

adding, to a forbidden list by the device, identification information of the first mobility management area in which the device is currently registered, where the forbidden list is used to record a mobility management area in which the initiation of the mobility management procedure is forbidden, and identification information of the second mobility management area is not recorded in the forbidden list.

With reference to the fourth possible implementation manner of the first aspect or the fifth possible implementation manner of the first aspect or the sixth possible implementation manner of the first aspect or the seventh possible implementation manner of the first aspect, in a ninth possible implementation manner of the first aspect, the setting, by the device, an initiation condition parameter that is used to forbid initiation of the mobility management procedure in a mobility management area in a list of mobility management areas in which the device is currently registered includes:

adding, to a forbidden list by the device, identification information of the mobility management area in the list of mobility management areas in which the device is currently registered, where the forbidden list is used to record a mobility management area in which the initiation of the mobility management procedure is forbidden, and identification information of the second mobility management area is not recorded in the forbidden list.

With reference to the eighth possible implementation manner of the first aspect, in a tenth possible implementation manner of the first aspect, after the initiating, by the device, the mobility management procedure, the method further includes: deleting, by the device, the identification information of the first mobility management area from the forbidden list.

With reference to the ninth possible implementation manner of the first aspect, in an eleventh possible implementation manner of the first aspect, after the initiating, by the device, the mobility management procedure, the method further includes:

deleting, by the device, the identification information of the mobility management area in the list of mobility management areas from the forbidden list.

According to a second aspect, the present invention provides a device, including a determining unit, a setting unit, and an initiation unit, where the determining unit is configured to: when a quantity N of failures of a mobility management procedure initiated by the device to a core network entity is greater than or equal to a first threshold, determine whether N pieces of failure information include first information used to indicate a failure in establishing a radio resource control protocol connection, where the first threshold is an integer greater than 0, N is an integer greater than 0, and the N pieces of failure information are failure information obtained from the N failures of the mobility management procedure initiated by the device to the core network entity;

the setting unit is configured to: when the determining unit determines that the N pieces of failure information include the first information, set an initiation condition parameter for initiating the mobility management procedure; and the initiation unit is configured to initiate the mobility management procedure based on the initiation condition parameter.

In a first possible implementation manner of the second aspect, the determining unit is specifically configured to: when the quantity N of failures of the mobility management procedure initiated by the device to the core network entity is greater than or equal to the first threshold, determine whether a quantity of first information included in the N pieces of failure information is greater than or equal to a second threshold, where the second threshold is a positive integer not greater than the first threshold; or the determining unit is specifically configured to: when the quantity N of failures of the mobility management procedure initiated by the device to the core network entity is greater than or equal to the first threshold, determine whether the last piece of failure information of the N pieces of failure information is the first information.

With reference to the second aspect or the first possible implementation manner of the second aspect, in a second possible implementation manner of the second aspect, the setting unit is specifically configured to: when the determining unit determines that the N pieces of failure information include the first information, adjust preset duration of a timer to first duration shorter than the preset duration, where the timer is used to be started when the quantity N of failures of the initiated mobility management procedure is greater than or equal to the first threshold; and the initiation unit is specifically configured to initiate the mobility management procedure when the timer exceeds the first duration.

With reference to the second possible implementation manner of the second aspect, in a third possible implementation manner of the second aspect, the device further includes:

a first judgment unit, configured to: when the determining unit determines that the N pieces of failure information include the first information, determine whether a mobility management area to which all cells currently detected by listening belong is the same as a mobility management area in which the device is currently registered; and if a determining result is positive, trigger the setting unit to adjust the preset duration of the timer to the first duration shorter than the preset duration; or a second judgment unit, configured to: when the determining unit determines that the N pieces of failure information include the first information, determine whether a mobility management area to which all cells currently detected by listening belong is in a list of mobility management areas in which the device is currently registered; and if a determining result is positive, trigger the setting unit to adjust the preset duration of the timer to the first duration shorter than the preset duration.

With reference to the second aspect or the first possible implementation manner of the second aspect, in a fourth possible implementation manner of the second aspect, the setting unit is specifically configured to: when the determining unit determines that the N pieces of failure information include the first information, set an initiation condition parameter that is used to forbid initiation of the mobility management procedure in a first mobility management area in which the device is currently registered; or the setting unit is specifically configured to: when the determining unit determines that the N pieces of failure information include the first information, set an initiation condition parameter that is used to forbid initiation of the mobility management procedure in a mobility management area in a list of mobility management areas in which the device is currently registered; and the initiation unit is specifically configured to perform a cell reselection procedure according to the initiation condition parameter, and initiate the mobility management procedure to the core network entity when the device selects a cell that belongs to a second mobility management area, where the second mobility management area is a mobility management area in which initiation of the mobility management procedure is not forbidden.

With reference to the fourth possible implementation manner of the second aspect, in a fifth possible implementation manner of the second aspect, the setting unit is further configured to: when the determining unit determines that the N pieces of failure information include the first information, determine whether a target cell exists in a cell currently detected by listening, where a mobility management area to which the target cell belongs is not the first mobility management area, and the target cell meets a cell selection condition; and if yes, set the initiation condition parameter that is used to forbid the initiation of the mobility management procedure in the first mobility management area; or the setting unit is further configured to: when the determining unit determines that the N pieces of failure information include the first information, determine whether a target cell exists in a cell currently detected by listening, where a mobility management area to which the target cell belongs is not in the list of mobility management areas in which the device is currently registered, and the target cell meets a cell selection condition; and if yes, set the initiation condition parameter that is used to forbid the initiation of the mobility management procedure in the mobility management area in the list of mobility management areas.

With reference to the second aspect or the first possible implementation manner of the second aspect, in a sixth possible implementation manner of the second aspect, the setting unit is specifically configured to: when the determining unit determines that the N pieces of failure information include the first information, adjust preset duration of a timer to first duration shorter than the preset duration, and set an initiation condition parameter that is used to forbid initiation of the mobility management procedure in a first mobility management area in which the device is currently registered, where the timer is used to be started when the quantity N of failures of the initiated mobility management procedure is greater than or equal to the first threshold; or the setting unit is specifically configured to: when the determining unit determines that the N pieces of failure information include the first information, adjust preset duration of a timer to first duration shorter than the preset duration, and set an initiation condition parameter that is used to forbid initiation of the mobility management procedure in a mobility management area in a list of mobility management areas in which the device is currently registered, where the timer is used to be started when the quantity N of failures of the initiated mobility management procedure is greater than or equal to the first threshold; and the initiation unit is specifically configured to perform a cell reselection procedure according to the initiation condition parameter, and when the device selects a cell that belongs to a second mobility management area, stop the timer and initiate the mobility management procedure to the core network entity, where the second mobility management area is a mobility management area in which initiation of the mobility management procedure is not forbidden.

With reference to the fourth possible implementation manner of the second aspect, in a seventh possible implementation manner of the second aspect, the setting unit is further configured to: when the determining unit determines that the N pieces of failure information include the first information, add, to a forbidden list, identification information of the first mobility management area in which the device is currently registered; or the setting unit is further configured to: when the determining unit determines that the N pieces of failure information include the first information, set the initiation condition parameter that is used to forbid the initiation of the mobility management procedure in the mobility management area in the list of mobility management areas in which the device is currently registered, where the forbidden list is used to record a mobility management area in which the initiation of the mobility management procedure is forbidden, and identification information of the second mobility management area is not recorded in the forbidden list.

With reference to the seventh possible implementation manner of the second aspect, in an eighth possible implementation manner of the second aspect, the apparatus further includes:

a deletion unit, configured to delete the identification information of the first mobility management area from the forbidden list; or configured to delete the identification information of the mobility management area in the list of mobility management areas from the forbidden list.

According to a third aspect, the present invention provides a device, where the device includes: a processor, a network interface, a memory, and a communications bus, where the communications bus is configured to implement connection and communication between the processor, the network interface, and the memory, and the processor is configured to execute a program stored in the memory, and the program includes:

when a quantity N of failures of a mobility management procedure initiated by the device to a core network entity is greater than or equal to a first threshold, determining whether N pieces of failure information include first information used to indicate a failure in establishing a radio resource control protocol connection, where the first threshold is an integer greater than 0, N is an integer greater than 0, and the N pieces of failure information are failure information obtained from the N failures of the mobility management procedure initiated by the device to the core network entity;

when it is determined that the N pieces of failure information include the first information, setting an initiation condition parameter for initiating the mobility management procedure; and initiating the mobility management procedure based on the initiation condition parameter.

In a first possible implementation manner of the third aspect, the program, executed by the processor, of determining whether N pieces of failure information include first information used to indicate a failure in establishing a radio resource control protocol connection includes:

determining whether a quantity of first information included in the N pieces of failure information is greater than or equal to a second threshold, where the second threshold is a positive integer that is not greater than the first threshold; or determining whether the last piece of failure information of the N pieces of failure information is the first information.

With reference to the third aspect or the first possible implementation manner of the third aspect, in a second possible implementation manner of the third aspect, the program, executed by the processor, of setting an initiation condition parameter for initiating the mobility management procedure includes:

adjusting preset duration of a timer to first duration shorter than the preset duration, where the timer is used to be started when the quantity N of failures of the initiated mobility management procedure is greater than or equal to the first threshold; and the program, executed by the processor, of initiating the mobility management procedure based on the initiation condition parameter includes:

initiating the mobility management procedure when the timer exceeds the first duration.

With reference to the second possible implementation manner of the third aspect, in a third possible implementation manner of the third aspect, the program executed by the processor further includes:

when it is determined that the N pieces of failure information include the first information, determining whether a mobility management area to which all cells currently detected by listening belong is the same as a mobility management area in which the device is currently registered; and if yes, triggering the program of adjusting, by the device, preset duration of a timer to first duration shorter than the preset duration; or when it is determined that the N pieces of failure information include the first information, determining whether a mobility management area to which all cells currently detected by listening belong is in a list of mobility management areas in which the device is currently registered; and if yes, triggering the program of adjusting, by the device, preset duration of a timer to first duration shorter than the preset duration.

With reference to the third aspect or the first possible implementation manner of the third aspect, in a fourth possible implementation manner of the third aspect, the program, executed by the processor, of setting an initiation condition parameter for initiating the mobility management procedure includes:

setting an initiation condition parameter that is used to forbid initiation of the mobility management procedure in a first mobility management area in which the device is currently registered; or setting an initiation condition parameter that is used to forbid initiation of the mobility management procedure in a mobility management area in a list of mobility management areas in which the device is currently registered; and the program, executed by the processor, of initiating the mobility management procedure based on the initiation condition parameter includes:

performing a cell reselection procedure according to the initiation condition parameter, and initiating the mobility management procedure to the core network entity when the device selects a cell that belongs to a second mobility management area, where the second mobility management area is a mobility management area in which initiation of the mobility management procedure is not forbidden.

With reference to the fourth possible implementation manner of the third aspect, in a fifth possible implementation manner of the third aspect, the program, executed by the processor, of setting an initiation condition parameter that is used to forbid initiation of the mobility management procedure in a first mobility management area in which the device is currently registered includes:

determining whether a target cell exists in a cell currently detected by listening, where a mobility management area to which the target cell belongs is not the first mobility management area, and the target cell meets a cell selection condition; and if yes, setting the initiation condition parameter that is used to forbid the initiation of the mobility management procedure in the first mobility management area.

With reference to the fourth possible implementation manner of the third aspect, in a sixth possible implementation manner of the third aspect, the program, executed by the processor, of setting an initiation condition parameter that is used to forbid initiation of the mobility management procedure in a mobility management area in a list of mobility management areas in which the device is currently registered includes:

determining whether a target cell exists in a cell currently detected by listening, where a mobility management area to which the target cell belongs is not in the list of mobility management areas in which the device is currently registered, and the target cell meets a cell selection condition; and if yes, setting the initiation condition parameter that is used to forbid the initiation of the mobility management procedure in the mobility management area in the list of mobility management areas.

With reference to the third aspect or the first possible implementation manner of the third aspect, in a seventh possible implementation manner of the third aspect, the program, executed by the processor, of setting an initiation condition parameter for initiating the mobility management procedure includes:

adjusting preset duration of a timer to first duration shorter than the preset duration, and setting an initiation condition parameter that is used to forbid initiation of the mobility management procedure in a first mobility management area in which the device is currently registered, where the timer is used to be started when the quantity N of failures of the initiated mobility management procedure is greater than or equal to the first threshold; or adjusting preset duration of a timer to first duration shorter than the preset duration, and setting an initiation condition parameter that is used to forbid initiation of the mobility management procedure in a mobility management area in a list of mobility management areas in which the device is currently registered, where the timer is used to be started when the quantity N of failures of the initiated mobility management procedure is greater than or equal to the first threshold; and the program, executed by the processor, of initiating the mobility management procedure based on the initiation condition parameter includes:

performing a cell reselection procedure according to the initiation condition parameter; and when a cell that belongs to a second mobility management area is selected, stopping the timer and initiating the mobility management procedure to the core network entity, where the second mobility management area is a mobility management area in which initiation of the mobility management procedure is not forbidden.

With reference to the fifth optional implementation manner of the third aspect or the sixth possible implementation manner of the third aspect or the seventh possible implementation manner of the third aspect, in an eighth possible implementation manner of the third aspect, the program, executed by the processor, of setting an initiation condition parameter that is used to forbid initiation of the mobility management procedure in a first mobility management area in which the device is currently registered includes:

adding, to a forbidden list, identification information of the first mobility management area in which the device is currently registered, where the forbidden list is used to record a mobility management area in which the initiation of the mobility management procedure is forbidden, and identification information of the second mobility management area is not recorded in the forbidden list.

With reference to the fifth optional implementation manner of the third aspect or the sixth possible implementation manner of the third aspect or the seventh possible implementation manner of the third aspect, in a ninth possible implementation manner of the third aspect, the program, executed by the processor, of setting an initiation condition parameter that is used to forbid initiation of the mobility management procedure in a mobility management area in a list of mobility management areas in which the device is currently registered includes:

adding, to a forbidden list, identification information of the mobility management area in the list of mobility management areas in which the device is registered, where the forbidden list is used to record a mobility management area in which the initiation of the mobility management procedure is forbidden, and identification information of the second mobility management area is not recorded in the forbidden list.

With reference to the eighth optional implementation manner of the third aspect, in a tenth possible implementation manner of the third aspect, the program executed by the processor further includes:

deleting the identification information of the first mobility management area from the forbidden list.

With reference to the ninth optional implementation manner of the third aspect, in an eleventh possible implementation manner of the third aspect, the program executed by the processor further includes:

deleting the identification information of the mobility management area in the list of mobility management areas from the forbidden list.

In the foregoing technical solution, when a quantity N of failures of a mobility management procedure initiated by a device to a core network entity is greater than or equal to a first threshold, the device determines whether N pieces of failure information include first information used to indicate a failure in establishing a radio resource control protocol connection; when determining that the N pieces of failure information include the first information, the device sets an initiation condition parameter for initiating the mobility management procedure; and the device initiates the mobility management procedure based on the initiation condition parameter. In comparison with the prior art in which a mobility management procedure is not initiated until a timing apparatus expires, in the present invention, the mobility management procedure can be initiated more quickly, so that a network access speed of the device can be improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The embodiments of the disclosure are described below with reference to the accompanying drawings.

In an embodiment of the present invention, a mobility management procedure may include any one or more following procedures:

a current location registration procedure, a cell handover procedure, a call processing procedure, an attach procedure, a TAU procedure, a routing area update (English full name: Route Area Update, English acronym: RAU) procedure, and a location area update (English full name: Location Area Update, English acronym: LAU) procedure.

In addition, in this embodiment of the present invention, initiation of a mobility management procedure may include the following steps:

a device establishes an RRC connection to a base station; and after the RRC connection is established, the device sends a mobility management request (for example, an attach request or a TAU request) to a core network entity (for example, an MME, an SGSN, or an MSC) by using the base station, and the core network entity responds to the mobility management request.

A failure in initiating the mobility management procedure may refer to: the base station fails to respond to the mobility management request, for example, establishment of the RRC connection fails; or after the RRC connection is successfully established, the device fails to send the mobility management request to the core network entity; or the device successfully sends the mobility management request to the core network entity by using the base station, but the core network entity is unable to respond to the mobility management request; or the device successfully sends the mobility management request to the core network entity by using the base station, but the core network finds an error and rejects the mobility management request.

In addition, a scenario to which this embodiment of the present invention is applied may be any radio communications system, for example, a 2G, 3G, or 4G radio communications system or a radio communications system of a higher release.

Figure 1:
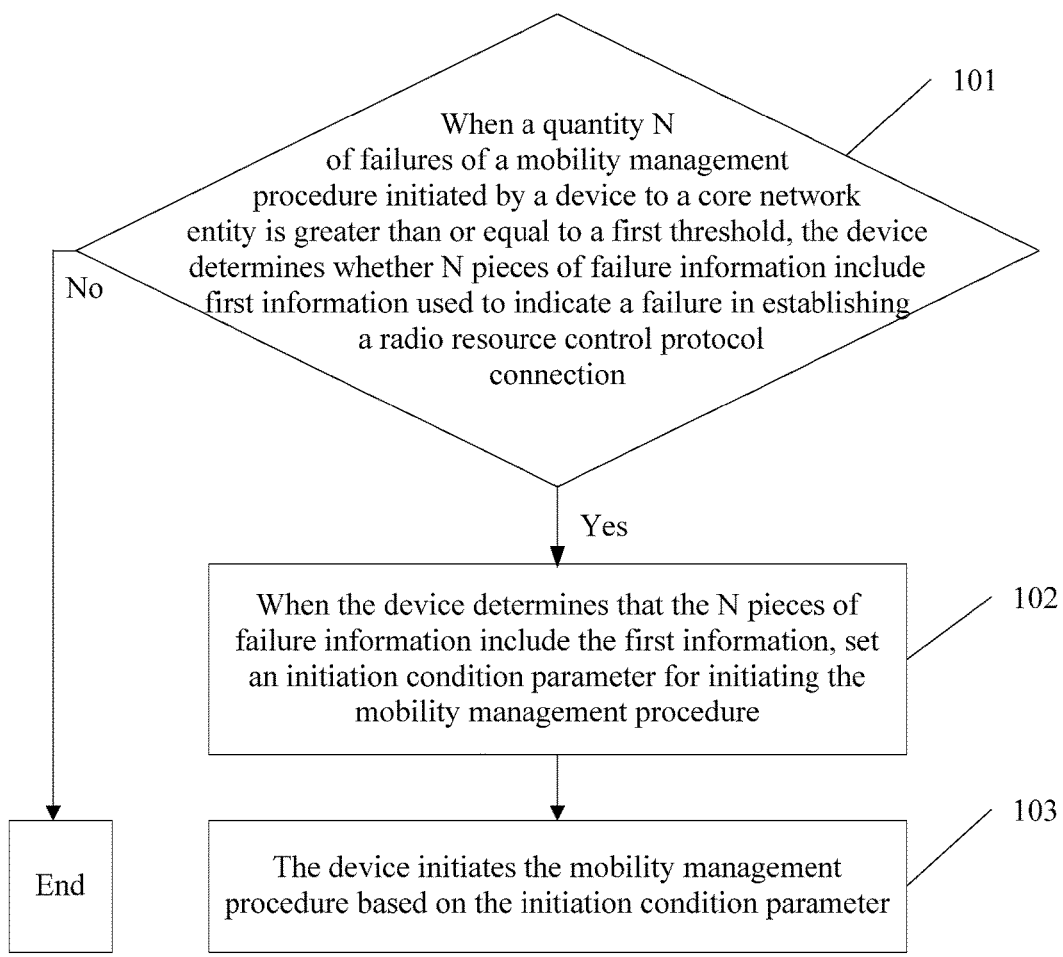
FIG. 1 is a schematic flowchart of a mobility management procedure initiation method according to an embodiment of the present invention.

Referring to FIG. 1, FIG. 1 is a schematic flowchart of a mobility management procedure initiation method according to an embodiment of the present invention. As shown in FIG. 1, the method includes the following steps:

101. When a quantity N of failures of a mobility management procedure initiated by a device to a core network entity is greater than or equal to a first threshold, the device determines whether N pieces of failure information include first information used to indicate a failure in establishing a radio resource control protocol connection, where the first threshold is an integer greater than 0, N is an integer greater than 0, and the N pieces of failure information are failure information obtained from the N failures of the mobility management procedure initiated by the device to the core network entity.

It should be noted that the failure information and the first information that are involved in this specification may include one or more digits or may include one or more letters or may include one or more digits and letters, and certainly may be formed in other manners, which is not limited herein.

Optionally, the foregoing first information may also indicate a preset specific RRC failure, for example, an uplink data configuration failure, a random access failure, or an RRC connection establishment failure.

Optionally, the device presets a timer that is used to be started when the quantity N of failures of the initiated mobility management procedure is greater than or equal to the first threshold. In this way, when the device determines that the N pieces of failure information do not include the first information, the mobility management procedure may be initiated when the timer exceeds preset duration of the timer.

Alternatively, when the device determines that the N pieces of failure information do not include the first information, the procedure is ended. In an example of an accompanying drawing of this embodiment of the present invention, the procedure is ended when a determining result is negative.

102. When the device determines that the N pieces of failure information include the first information, set an initiation condition parameter for initiating the mobility management procedure.

Optionally, the foregoing initiation condition parameter may be a condition parameter that the device needs to meet when the mobility management procedure is being initiated. That is, when the device meets the condition parameter, the mobility management procedure can be initiated. For example, the initiation condition parameter may include an initiation time parameter, a parameter for initiating the mobility management procedure, or the like.

Optionally, if the device presets an initiation condition parameter, the setting an initiation condition parameter in step 102 may be: modifying the initiation condition parameter preset by the device, so that the device can initiate the mobility management procedure more quickly, where "more quickly" is termed in comparison with a mobility management procedure that is initiated based on an unmodified initiation condition parameter. In addition, the initiation condition parameter that is set in step 102 may also be a newly generated initiation condition parameter.

103. The device initiates the mobility management procedure based on the initiation condition parameter.

Optionally, the initiation of the mobility management procedure in step 103 may be: continuing to initiate a mobility management procedure to the foregoing core network entity, or initiating a mobility management procedure to another core network entity.

By using the foregoing steps, it may be implemented that when the quantity of failures of the initiated mobility management procedure is greater than or equal to the first threshold and when the N pieces of failure information include the first information, the mobility management procedure may be initiated again based on the initiation condition parameter that is set. Because the device does not establish communication with a core network when no RRC connection is successfully established, and a failure in establishing the RRC connection may occur randomly, the mobility management procedure may succeed when the mobility management procedure is initiated again based on the initiation condition parameter that is set.

It should be noted that the device involved in this specification may be any device capable of accessing a network, for example, UE, where the UE may be a tablet computer, a mobile phone, an electronic reader, a remote controller, a personal computer (English full name: Personal Computer, English acronym: PC), a notebook computer, a vehicle-mounted device, a web television, a wearable device, or the like. Alternatively, the foregoing device may be a processor, for example, a processor that has a modem (modem) or a processor that has a modem function.

In this embodiment, when a quantity N of failures of a mobility management procedure initiated by a device to a core network entity is greater than or equal to a first threshold, the device determines whether N pieces of failure information include first information used to indicate a failure in establishing a radio resource control protocol connection; when determining that the N pieces of failure information include the first information, the device sets an initiation condition parameter for initiating the mobility management procedure; and the device initiates the mobility management procedure based on the initiation condition parameter. In comparison with the prior art in which a mobility management procedure is not initiated until a timing apparatus expires, in the present invention, the mobility management procedure can be initiated more quickly, so that a network access speed of the device can be improved.

Figure 2:
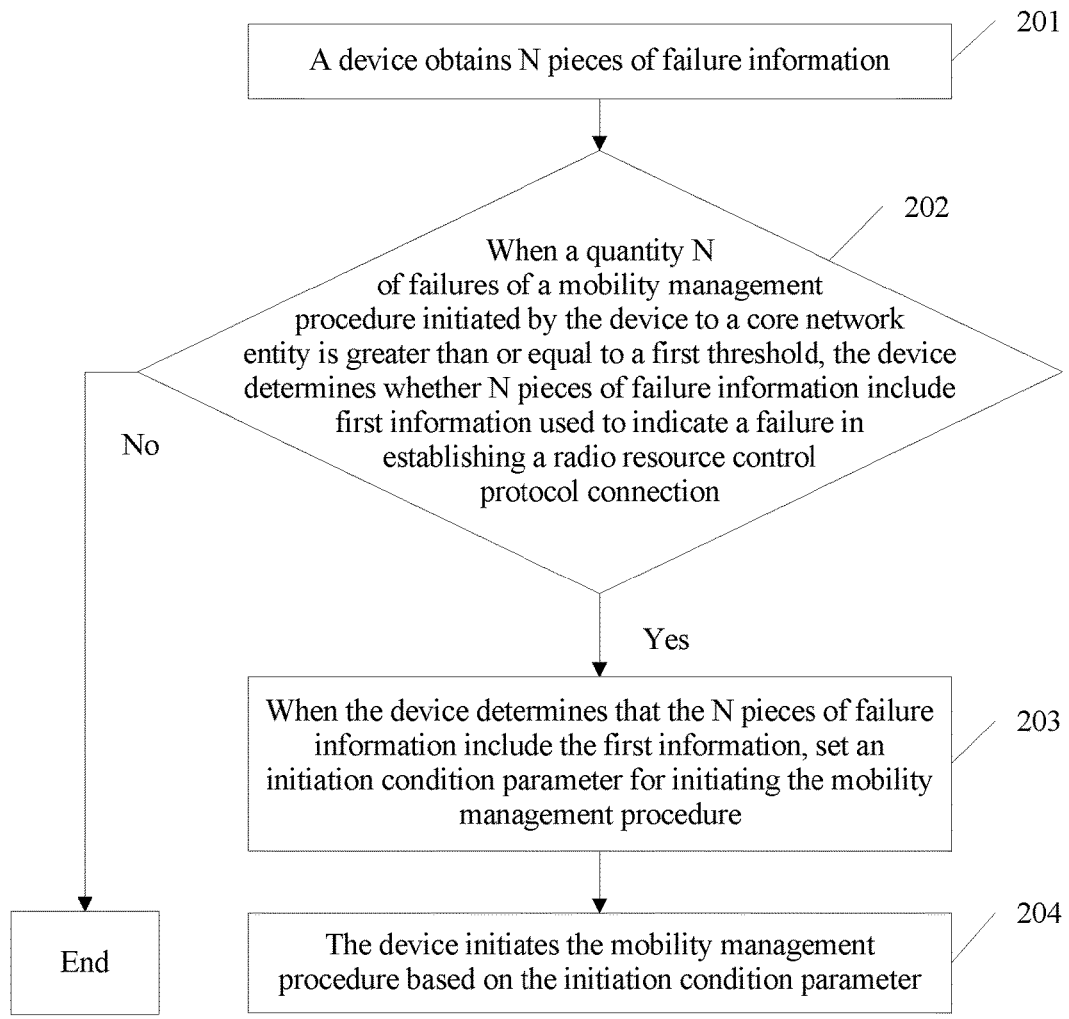
FIG. 2 is a schematic flowchart of another mobility management procedure initiation method according to an embodiment of the present invention.

Referring to FIG. 2, FIG. 2 is a schematic flowchart of another mobility management procedure initiation method according to an embodiment of the present invention. As shown in FIG. 2, the method includes the following steps:

201. A device obtains N pieces of failure information, where the N pieces of failure information are failure information obtained from N failures of a mobility management procedure initiated by the device to a core network entity.

For example, step 201 may be: when the mobility management procedure initiated by the device to the core network entity fails, obtaining failure information of this failure. In this way, when step 201 is performed multiple times, that is, there are multiple failures, the N pieces of failure information can be obtained.

Optionally, the foregoing failure information may be failure information generated by the device, or sent by a network-side device (for example, a base station) and received by the device. In addition, the device may identify a failure type by using the failure information, for example, identify a random access failure; or the device cannot identify a failure type by using the failure information, for example, an unknown failure.

202. When a quantity N of failures of the mobility management procedure initiated by the device to the core network entity is greater than or equal to a first threshold, the device determines whether the N pieces of failure information include first information used to indicate a failure in establishing a radio resource control protocol connection; and if yes, the device performs step 203, where the first threshold is an integer greater than 0.

Optionally, the first information includes one or more of the following:

TRANSMISSION_LTE_RRC_UL_DATA_CNF_FAILURE_CONN_REL (a connection release caused by an uplink data configuration failure);

TRANSMISSION_LTE_RRC_UL_DATA_CNF_FAILURE_RLF (a radio link failure caused by an uplink data configuration failure);

CONN_CNF_LTE_RRC_CONN_EST_FAILURE: RRC (a connection establishment failure);

CONN_CNF_LTE_RRC_CONN_EST_FAILURE_ABORTED: RRC (a connection establishment failure, reason: aborted);

CONN_CNF_LTE_RRC_CONN_EST_FAILURE_CELL_RESEL: RRC (a connection establishment failure, reason: cell reselection);

CONN_CNF_LTE_RRC_CONN_EST_FAILURE_CONFIG_FAILURE: RRC (a connection establishment failure, reason: a configuration error);

CONN_CNF_LTE_RRC_CONN_EST_FAILURE_TIMER_EXPIRED: RRC (a connection establishment failure, reason: expired);

CONN_CNF_LTE_RRC_CONN_EST_FAILURE_LINK_FAILURE: RRC (a connection establishment failure, reason: a link failure);

CONN_CNF_LTE_RRC_CONN_EST_FAILURE_NOT_CAMPED: RRC (a connection establishment failure, reason: not camped);

CONN_CNF_LTE_RRC_CONN_EST_FAILURE_SI_FAILURE: RRC (a connection establishment failure, reason: a system information error); and CONN_CNF_LTE_RRC_CONN_EST_FAILURE_TAI_CHANGED: RRC (a connection establishment failure, reason: TAI changed).

The RRC connection establishment failure may include a random access failure (for example, CONN_CNF_LTE_RRC_CONN_EST_FAILURE_TIMER_EXPIRED: RRC (a connection establishment failure, reason: expired), for example, a random access channel (English full name: Random Access Channel, English acronym: RACH) connection failure.

Optionally, that the device determines whether the N pieces of failure information include first information used to indicate a failure in establishing a radio resource control protocol connection includes:

determining, by the device, whether a quantity of first information included in the N pieces of failure information is greater than or equal to a second threshold, where the second threshold is a positive integer that is not greater than the first threshold.

The first threshold and the second threshold may be preset. For example, the first threshold is set to 5 (or 6), and the second threshold is set to be greater than or equal to 1 and less than or equal to 5 (or 6). For example, when the quantity of failures of the mobility management procedure initiated to the core network entity reaches five, and one, two, three, four, or five of the five pieces of failure information are the first information, step 203 may be performed.

Optionally, that the device determines whether the N pieces of failure information include first information used to indicate a failure in establishing a radio resource control protocol connection may include:

determining, by the device, whether the last piece of failure information of the N pieces of failure information is the first information.

For example, if the first threshold is 5, when the fifth piece of failure information is the first information, step 203 may be performed.

Optionally, that the quantity of failures of the mobility management procedure initiated by the device to the core network entity is greater than or equal to the first threshold may be: a quantity of continuous failures of the mobility management procedure initiated by the device to the core network entity is greater than or equal to the first threshold, or the quantity of failures of the mobility management procedure initiated by the device to the core network entity is greater than or equal to the first threshold within a specified time (for example, 1 minute or 5 minutes).

203. When the device determines that the N pieces of failure information include the first information, the device sets an initiation condition parameter for initiating the mobility management procedure.

204. The device initiates the mobility management procedure based on the initiation condition parameter.

Optionally, step 203 may include:

when the device determines that the N pieces of failure information include the first information, adjusting preset duration of a timer to first duration shorter than the preset duration, where the timer is used to be started when the quantity N of failures of the initiated mobility management procedure is greater than or equal to the first threshold.

Step 204 may include:

initiating, by the device, the mobility management procedure when the timer exceeds the first duration.

Therefore, in this implementation manner, when it is determined that the N pieces of failure information include the first information, the preset duration of the timer may be shortened, for example, from original 12 minutes to 2 minutes, so that the mobility management procedure can be initiated more quickly.

The timer may be used to be started when the quantity of failures of the mobility management procedure initiated by the device is greater than or equal to the first threshold, for example, a timer T3402 in a device with a function of connecting to a 4G network, or a timer T3302 in a device with a function of connecting to a 2G or 3G network.

In this implementation manner, optionally, before step 203, the method may further include:

when the device determines that the N pieces of failure information include the first information, determining whether a mobility management area to which all cells currently detected by listening belong is the same as a mobility management area in which the device is currently registered; and if yes, triggering the step of adjusting, by the device, preset duration of a timer to first duration shorter than the preset duration.

All the cells currently detected by listening are all cells that are currently detected by listening by the device. For example, when routing areas to which all cells detected by listening by the device with the function of connecting to a 2G or 3G network belong are the same as a routing area in which the device is currently located, the preset duration of the timer is shortened.

In addition, the mobility management area in which the device is currently registered may be a mobility management area that is sent by the core network entity to the device after the device successfully performs an attach, a TAU, an RAU, or an LAU procedure, for example, an area identified by a tracking area identity (Tracking Areas Identity, TAI), a routing area identity (Route Area Identity, RAI), or a location area identity (Location Area Identity, LAI) that is sent.

Optionally, the mobility management area may be a tracking area, a routing area, or a location area.

In addition, in this implementation manner, step 204 may be: initiating the mobility management procedure to the core network entity by using a base station of the mobility management area in which the device is currently registered. Therefore, in this implementation manner, it may be implemented that when the mobility management area in which the device is currently located is not changed, the mobility management procedure can continue to be initiated to the core network entity by using the base station of the original mobility management area. In addition, the base station of the mobility management area in which the device is currently registered may be a base station of any cell in the mobility management area.

In this implementation manner, optionally, before step 203, the method may further include:

when the device determines that the N pieces of failure information include the first information, determining whether a mobility management area to which all cells currently detected by listening belong is in a list of mobility management areas in which the device is currently registered; and if yes, triggering the step of adjusting, by the device, preset duration of a timer to first duration shorter than the preset duration.

The list of mobility management areas in which the device is currently registered is a list of mobility management areas such as a TAI list that is sent by the core network entity to the device after the device successfully performs an attach or a TAU procedure. In addition, the list of mobility management areas is one mobility management area or a combination of multiple mobility management areas.

In addition, in this implementation manner, step 201 may be initiating, by the device, the mobility management procedure to the core network entity by using a base station of a mobility management area in the list of mobility management areas, and step 204 may also be initiating the mobility management procedure to the core network entity by using a base station of a mobility management area in the list of mobility management areas.

Optionally, step 203 may include:

setting, by the device, an initiation condition parameter that is used to forbid initiation of the mobility management procedure in a first mobility management area in which the device is currently registered; or setting, by the device, an initiation condition parameter that is used to forbid initiation of the mobility management procedure in a mobility management area in a list of mobility management areas in which the device is currently registered.

Step 204 may include:

performing, by the device, a cell reselection procedure according to the initiation condition parameter, and initiating the mobility management procedure to the core network entity when the device selects a cell that belongs to a second mobility management area, where the second mobility management area is a mobility management area in which initiation of the mobility management procedure is not forbidden.

It should be noted that, in this embodiment, that the device initiates the mobility management procedure to the core network entity in step 204 may be: initiating the mobility management procedure to the core network entity by using a base station of the foregoing selected cell that belongs to the second mobility management area.

In this way, it may be implemented that an initiation condition for forbidding the initiation of the mobility management procedure in the first mobility management area can be set, and an initiation condition for forbidding the initiation of the mobility management procedure in the mobility management area in the list of mobility management areas can be set. In other words, an initiation condition for initiating the mobility management procedure by the device may be: skipping initiating the mobility management procedure to a mobility management area in which the initiation of the mobility management procedure is forbidden.

In this implementation manner, optionally, the step of performing a cell reselection procedure according to the initiation condition parameter may include:

selecting, by the device from the cells detected by listening, a cell belonging to a mobility management area that is not a mobility management area recorded in the condition parameter, and using the cell as the cell that belongs to the second mobility management area. In addition, when multiple cells belonging to mobility management areas that are not mobility management areas recorded in the condition parameter are detected by listening, one cell may be selected from the multiple cells. For example, a cell whose reference signal has the highest signal strength is selected.

In this implementation manner, optionally, step 203 may include:

determining, by the device, whether a target cell exists in a cell currently detected by listening, where a mobility management area to which the target cell belongs is not the first mobility management area, and the target cell meets a cell selection condition; and if yes, setting the initiation condition parameter that is used to forbid the initiation of the mobility management procedure in the first mobility management area; or determining, by the device, whether a target cell exists in a cell currently detected by listening, where a mobility management area to which the target cell belongs is not in the list of mobility management areas in which the device is currently registered, and the target cell meets a cell selection condition; and if yes, setting the initiation condition parameter that is used to forbid the initiation of the mobility management procedure in the mobility management area in the list of mobility management areas.

The cell selection condition may be that signal strength of a reference signal of the cell detected by listening by the device is greater than a specific threshold.

In addition, step 204 may be: initiating the mobility management procedure to the core network entity by using a base station of the target cell; or may be understood as: the cell that belongs to the second mobility management area is the target cell. Certainly, in this embodiment, the mobility management procedure may also be initiated to the core network entity by using a base station of the cell that belongs to the second mobility management area.

In this implementation manner, it may be implemented that when a cell belonging to a mobility management area that is not the mobility management area in which the device is currently registered exists in the cell detected by listening by the device, the mobility management procedure can be initiated to the core network entity when the device selects the cell that belongs to the second mobility management area. Because the mobility management procedure initiated by the device to the first mobility management area fails, the mobility management procedure initiated by the device by using the second mobility management area may succeed.

Optionally, step 203 may include:

adjusting, by the device, preset duration of a timer to first duration shorter than the preset duration, and setting an initiation condition parameter that is used to forbid initiation of the mobility management procedure in a first mobility management area in which the device is currently registered, where the timer is used to be started when the quantity N of failures of the initiated mobility management procedure is greater than or equal to the first threshold; or adjusting, by the device, preset duration of a timer to first duration shorter than the preset duration, and setting an initiation condition parameter that is used to forbid initiation of the mobility management procedure in a mobility management area in a list of mobility management areas in which the device is currently registered, where the timer is used to be started when the quantity N of failures of the initiated mobility management procedure is greater than or equal to the first threshold.

Step 204 may include:

when the device selects a cell that belongs to a second mobility management area, stopping, by the device, the timer, and initiating the mobility management procedure to the core network entity, where the second mobility management area is a mobility management area in which initiation of the mobility management procedure is not forbidden.

An order of performing operations of the adjusting and the setting is not limited.

Similarly, in this implementation manner, optionally, step 203 may include:

determining, by the device, whether a target cell exists in a cell currently detected by listening, where a mobility management area to which the target cell belongs is not the first mobility management area, and the target cell meets a cell selection condition; and if yes, adjusting the preset duration of the timer to the first duration shorter than the preset duration, and setting the initiation condition parameter that is used to forbid the initiation of the mobility management procedure in the first mobility management area in which the device is currently registered; or determining, by the device, whether a target cell exists in a cell currently detected by listening, where a mobility management area to which the target cell belongs is not in the list of mobility management areas in which the device is currently registered, and the target cell meets a cell selection condition; and if yes, adjusting the preset duration of the timer to the first duration shorter than the preset duration, and setting an initiation condition parameter that is used to forbid the initiation of the mobility management procedure in the mobility management area in the list of mobility management areas in which the device is currently registered.

Optionally, in the foregoing implementation manner, the step of the setting, by the device, an initiation condition parameter that is used to forbid initiation of the mobility management procedure in a first mobility management area in which the device is currently registered may include:

adding, to a forbidden list by the device, identification information of the first mobility management area in which the device is currently registered, where the forbidden list is used to record a mobility management area in which the initiation of the mobility management procedure is forbidden, and identification information of the second mobility management area is not recorded in the forbidden list.

For example, for a device with a function of connecting to a 2G or 3G network, the forbidden list may be a list of forbidden routes, and the identification information of the first mobility management area may be a routing area identity of a first routing area, or a routing area.

Optionally, in the foregoing implementation manner, the step of the setting, by the device, an initiation condition parameter that is used to forbid initiation of the mobility management procedure in a mobility management area in the list of mobility management areas in which the device is currently registered may include:

adding, to a forbidden list by the device, identification information of the mobility management area in the list of mobility management areas in which the device is currently registered, where the forbidden list is used to record a mobility management area in which the initiation of the mobility management procedure is forbidden, and identification information of the second mobility management area is not recorded in the forbidden list.

Specifically, identification information of all mobility management areas in the list of mobility management areas is added to the forbidden list.

Optionally, the forbidden list may be generated by the device in advance, or may be sent by the core network entity and received by the device in advance.

For example, for a device with a function of connecting to a 4G network, the forbidden list may be a list of forbidden tracking areas (Lists of forbidden tracking areas), and the identification information may be a tracking area identity (Tracking Areas Identity, TAI) or a tracking area code (Tracking Areas Code, TAC). For example, the performing a cell reselection procedure according to the initiation condition parameter may be: sending, by a non access stratum (Non Access Stratum, NAS), the forbidden list to an RRC layer, and triggering, by the RRC layer, the cell reselection procedure according to the forbidden list.

In this implementation manner, optionally, after step 204, the method may further include:

deleting the identification information of the first mobility management area from the forbidden list; or deleting the identification information of the mobility management area in the list of mobility management areas from the forbidden list.

Specifically, the device may generate a new list when the identification information of the first mobility management area is added to the forbidden list, where the list records the identification information of the first mobility management area; or the device generates a new list when the identification information of the mobility management area in the list of mobility management areas in which the device is currently registered is added to the forbidden list, where the list records the identification information of the mobility management area in the list of mobility management areas. In this way, after step 204 is performed, identification information that is in the forbidden list and that is the same as identification information in the new list may be deleted, or the new list may be deleted.

Therefore, it may be implemented that the mobility management procedure can be initiated again subsequently to the core network entity by using the base station of the first mobility management area or the base station of the mobility management area in the list of mobility management areas.

In this embodiment, multiple optional implementation manners are added on the basis of the embodiment shown in FIG. 1, and can improve a network access speed of the device. In addition, the implementation manners described in this embodiment may also be applied to the embodiment shown in FIG. 1.

The following describes an apparatus embodiment of the present invention. The apparatus embodiment of the present invention is used to perform the methods implemented in method embodiments 1 to 2 of the present invention. For ease of description, only a part related to this embodiment of the present invention is shown. For technical details that are not disclosed, refer to Embodiment 1 and Embodiment 2 of the present invention.

Figure 3:
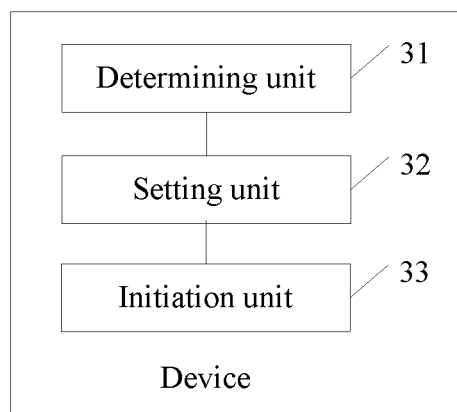
FIG. 3 is a schematic structural diagram of a device according to an embodiment of the present invention.

Referring to FIG. 3, FIG. 3 is a schematic structural diagram of a device according to an embodiment of the present invention. As shown in FIG. 3, the device includes: a determining unit 31, a setting unit 32, and an initiation unit 33.

The judgment unit 31 is configured to: when a quantity N of failures of a mobility management procedure initiated by the device to a core network entity is greater than or equal to a first threshold, determine whether N pieces of failure information include first information used to indicate a failure in establishing a radio resource control protocol connection, where the first threshold is an integer greater than 0, N is an integer greater than 0, and the N pieces of failure information are failure information obtained from the N failures of the mobility management procedure initiated by the device to the core network entity.

Optionally, the device presets a timer that is used to be started when the quantity N of failures of the initiated mobility management procedure is greater than or equal to the first threshold. In this way, when the determining unit 31 determines that the N pieces of failure information do not include the first information, the mobility management procedure may be initiated when the timer exceeds preset duration of the timer. Alternatively, when the determining unit 31 determines that the N pieces of failure information do not include the first information, the procedure is ended.

The setting unit 32 is configured to: when the determining unit 31 determines that the N pieces of failure information include the first information, set an initiation condition parameter for initiating the mobility management procedure.

The initiation unit 33 is configured to initiate the mobility management procedure based on the initiation condition parameter.

Optionally, the device may be any device capable of accessing a network, for example, UE, where the UE may be a device such as a tablet computer, a mobile phone, an electronic reader, a remote controller, a PC, a notebook computer, a vehicle-mounted device, a web television, or a wearable device. Alternatively, the foregoing device may be a processor, for example, a processor that has a modem (modem) or a processor that has a modem function.

In this embodiment, when a quantity N of failures of a mobility management procedure initiated by a device to a core network entity is greater than or equal to a first threshold, the device determines whether N pieces of failure information include first information used to indicate a failure in establishing a radio resource control protocol connection; when determining that the N pieces of failure information include the first information, the device sets an initiation condition parameter for initiating the mobility management procedure; and the device initiates the mobility management procedure based on the initiation condition parameter. In comparison with the prior art in which a mobility management procedure is not initiated until a timing apparatus expires, in the present invention, the mobility management procedure can be initiated more quickly, so that a network access speed of the device can be improved.

Figure 4:
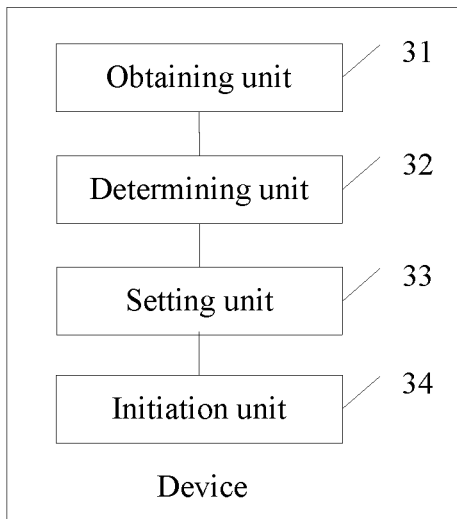
FIG. 4 is a schematic structural diagram of another device according to an embodiment of the present invention.

Referring to FIG. 4, FIG. 4 is a schematic structural diagram of another device according to an embodiment of the present invention. As shown in FIG. 4, the device includes: an obtaining unit 31, a determining unit 32, a setting unit 33, and an initiation unit 34.

The obtaining unit 31 is configured to obtain N pieces of failure information, where the N pieces of failure information are failure information obtained from N failures of a mobility management procedure initiated by the device to a core network entity.

For example, when the mobility management procedure initiated by the device to the core network entity fails, the obtaining unit 31 may obtain failure information of this failure. In this way, the obtaining unit 31 can obtain the N pieces of failure information.

The determining unit 32 is configured to: when a quantity N of failures of the mobility management procedure initiated by the device to the core network entity is greater than or equal to a first threshold, determine whether the N pieces of failure information include first information used to indicate a failure in establishing a radio resource control protocol connection, where the first threshold is an integer greater than 0.

The setting unit 33 is configured to: when the determining unit 32 determines that the N pieces of failure information include the first information, set an initiation condition parameter for initiating the mobility management procedure.

The initiation unit 34 is configured to initiate the mobility management procedure based on the initiation condition parameter.

Optionally, the determining unit 32 is specifically configured to: when the quantity N of failures of the mobility management procedure initiated by the device to the core network entity is greater than or equal to the first threshold, determine whether a quantity of first information included in the N pieces of failure information is greater than or equal to a second threshold, where the second threshold is a positive integer not greater than the first threshold.

Optionally, the determining unit 32 is specifically configured to: when the quantity N of failures of the mobility management procedure initiated by the device to the core network entity is greater than or equal to the first threshold, determine whether the last piece of failure information of the N pieces of failure information is the first information.

Optionally, the setting unit 33 is specifically configured to: when the determining unit 32 determines that the N pieces of failure information include the first information, adjust preset duration of a timer to first duration shorter than the preset duration, where the timer is used to be started when the quantity N of failures of the initiated mobility management procedure is greater than or equal to the first threshold; and the initiation unit 34 is specifically configured to initiate the mobility management procedure when the timer exceeds the first duration.

Therefore, in this implementation manner, when it is determined that the N pieces of failure information include the first information, the preset duration of the timer may be shortened, for example, from original 12 minutes to 2 minutes, so that the mobility management procedure can be initiated more quickly.

Figure 5:
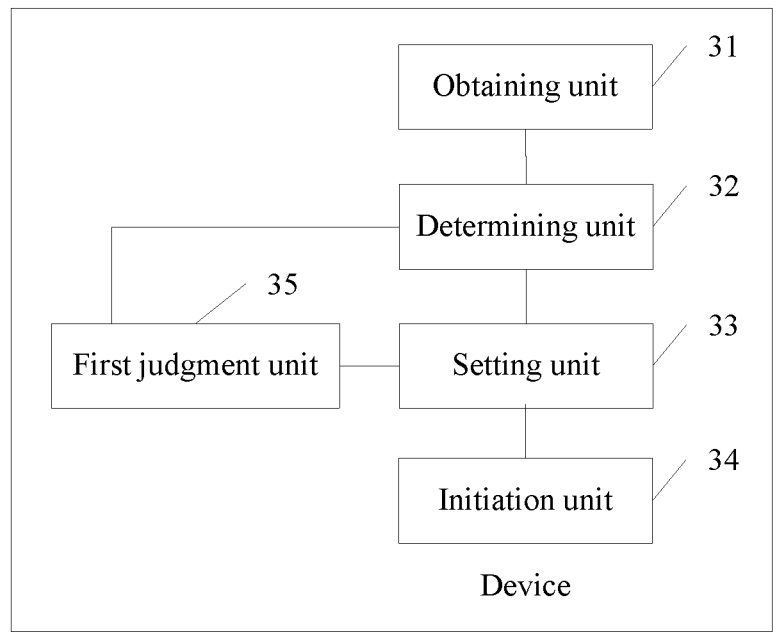
FIG. 5 is a schematic structural diagram of another device according to an embodiment of the present invention.

In this implementation manner, optionally, as shown in FIG. 5, the device may further include:
a first judgment unit 35, configured to: when the determining unit 32 determines that the N pieces of failure information include the first information, determine whether a mobility management area to which all cells currently detected by listening belong is the same as a mobility management area in which the device is currently registered; and if a determining result is positive, trigger the setting unit 33 to adjust the preset duration of the timer to the first duration shorter than the preset duration.

In addition, in this implementation manner, the initiation unit 44 may initiate the mobility management procedure to the core network entity by using a base station of the mobility management area currently registered by the device. Therefore, in this implementation manner, it may be implemented that when the mobility management area in which the device is currently located is not changed, the mobility management procedure can continue to be initiated to the core network entity by using the base station of the original mobility management area in which the device is currently registered.

Figure 6:
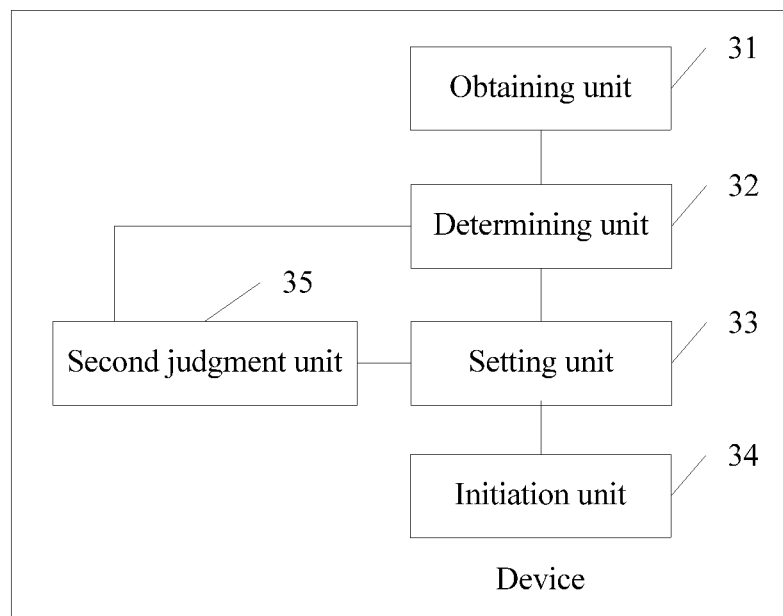
FIG. 6 is a schematic structural diagram of another device according to an embodiment of the present invention.

In this implementation manner, optionally, as shown in FIG. 6, the device may further include:
a second judgment unit 36, configured to: when the determining unit 32 determines that the N pieces of failure information include the first information, determine whether a mobility management area to which all cells currently detected by listening belong is in a list of mobility management areas in which the device is currently registered; and if a determining result is positive, trigger the setting unit 33 to adjust the preset duration of the timer to the first duration shorter than the preset duration.

Optionally, the setting unit 33 is specifically configured to: when the determining unit determines that the N pieces of failure information include the first information, set an initiation condition parameter that is used to forbid initiation of the mobility management procedure in a first mobility management area in which the device is currently registered; or the setting unit 33 is specifically configured to: when the determining unit determines that the N pieces of failure information include the first information, set an initiation condition parameter that is used to forbid initiation of the mobility management procedure in a mobility management area in a list of mobility management areas in which the device is currently registered.

The initiation unit 34 is specifically configured to perform a cell reselection procedure according to the initiation condition parameter, and initiate the mobility management procedure to the core network entity when the device selects a cell that belongs to a second mobility management area, where the second mobility management area is a mobility management area in which initiation of the mobility management procedure is not forbidden.

In this implementation manner, optionally, the setting unit 33 is further configured to: when the determining unit 31 determines that the N pieces of failure information include the first information, determine whether a target cell exists in a cell currently detected by listening, where a mobility management area to which the target cell belongs is not the first mobility management area, and the target cell meets a cell selection condition; and if yes, set the initiation condition parameter that is used to forbid the initiation of the mobility management procedure in the first mobility management area; or the setting unit 33 is further configured to: when the determining unit 31 determines that the N pieces of failure information include the first information, determine whether a target cell exists in a cell currently detected by listening, where a mobility management area to which the target cell belongs is not in the list of mobility management areas in which the device is currently registered, and the target cell meets a cell selection condition; and if yes, set the initiation condition parameter that is used to forbid the initiation of the mobility management procedure in the mobility management area in the list of mobility management areas.

In this implementation manner, it may be implemented that when a cell belonging to a mobility management area that is not the mobility management area in which the device is currently registered exists in the cell detected by listening by the device, the mobility management procedure can be initiated to the core network entity when the cell that belongs to the second mobility management area is selected. Because the mobility management procedure initiated by the device to the first mobility management area fails, the mobility management procedure initiated by the device by using the second mobility management area may succeed.

Optionally, the setting unit 33 is specifically configured to: when the determining unit 32 determines that the N pieces of failure information include the first information, adjust preset duration of a timer to first duration shorter than the preset duration, and set an initiation condition parameter that is used to forbid initiation of the mobility management procedure in a first mobility management area in which the device is currently registered, where the timer is used to be started when the quantity N of failures of the initiated mobility management procedure is greater than or equal to the first threshold; or the setting unit 33 is specifically configured to: when the determining unit 32 determines that the N pieces of failure information include the first information, adjust preset duration of a timer to first duration shorter than the preset duration, and set an initiation condition parameter that is used to forbid initiation of the mobility management procedure in a mobility management area in a list of mobility management areas in which the device is currently registered, where the timer is used to be started when the quantity N of failures of the initiated mobility management procedure is greater than or equal to the first threshold; and the initiation unit 34 is specifically configured to: when the device selects a cell that belongs to a second mobility management area, stop, by the device, the timer and initiate the mobility management procedure to the core network entity, where the second mobility management area is a mobility management area in which initiation of the mobility management procedure is not forbidden.

In addition, in this implementation manner, if no cell that belongs to the second mobility management area is selected when the foregoing timing apparatus expires, the mobility management procedure can be initiated to the core network entity by using the base station of the first mobility management area.

Optionally, the setting unit 33 is further configured to: when the determining unit 32 determines that the N pieces of failure information include the first information, add, to a forbidden list, identification information of the first mobility management area in which the device is currently registered; or the setting unit 33 is further configured to: when the determining unit 32 determines that the N pieces of failure information include the first information, add, to the forbidden list, identification information of the mobility management area in the list of mobility management areas in which the device is currently registered.

The forbidden list is used to record a mobility management area in which the initiation of the mobility management procedure is forbidden, and identification information of the second mobility management area is not recorded in the forbidden list.

Figure 7:
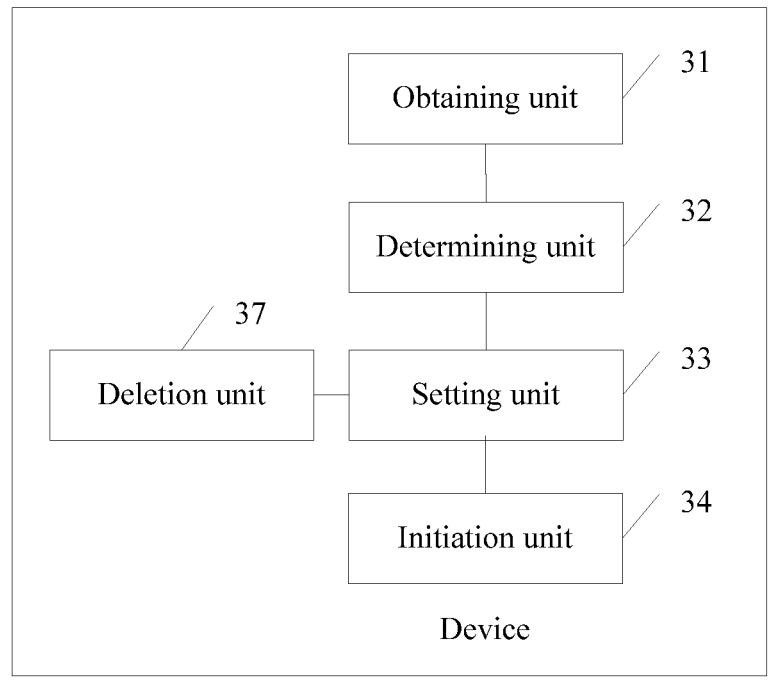
FIG. 7 is a schematic structural diagram of another device according to an embodiment of the present invention.

In this implementation manner, optionally, as shown in FIG. 7, the apparatus may further include:

a deletion unit 37, configured to delete the identification information of the first mobility management area from the forbidden list; or configured to delete the identification information of the mobility management area in the list of mobility management areas from the forbidden list.

In this embodiment, multiple optional implementation manners are added on the basis of the embodiment shown in FIG. 3, and can improve a network access speed of the device. In addition, the implementation manners described in this embodiment may also be applied to the embodiment shown in FIG. 3.

Figure 8:
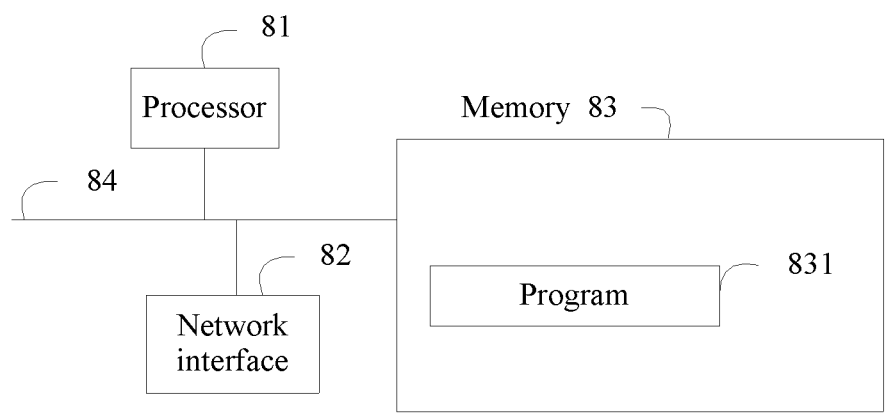
FIG. 8 is a schematic structural diagram of another device according to an embodiment of the present invention.

Referring to FIG. 8, FIG. 8 is a schematic structural diagram of another device according to an embodiment of the present invention. As shown in FIG. 8, the device includes a processor 81, a network interface 82, a memory 83, and a communications bus 84. The communications bus 84 is configured to implement connection and communication between the processor 81, the network interface 82, and the memory 83. The processor 81 is configured to execute a program 831 stored in the memory 83. For example, the device may include at least one processor 81 (for example, a CPU), at least one network interface 82 or another communications interface, a memory 83, and at least one communications bus 84 configured to implement connection and communication between the apparatuses. The processor 81 is configured to execute an executable module stored in the memory 83, such as a computer program. The memory 83 may include a high-speed random access memory (RAM, Random Access Memory), or may further include a non-volatile memory (non-volatile memory) such as at least one magnetic disk memory. Communication connection between the system gateway and at least one other network element is implemented by using the at least one network interface 82 (which may be wired or wireless), for example, the Internet, a wide area network, a local area network, or a metropolitan area network may be used.

In some implementation manners, the processor 83 stores the program 831, and the program 831 may be executed by the processor 81, and the program includes:

when a quantity N of failures of a mobility management procedure initiated by the device to a core network entity is greater than or equal to a first threshold, determining whether N pieces of failure information include first information used to indicate a failure in establishing a radio resource control protocol connection, where the first threshold is an integer greater than 0, N is an integer greater than 0, and the N pieces of failure information are failure information obtained from the N failures of the mobility management procedure initiated by the device to the core network entity;

when it is determined that the N pieces of failure information include the first information, setting an initiation condition parameter for initiating the mobility management procedure; and initiating the mobility management procedure based on the initiation condition parameter.

In another embodiment, the program, executed by the processor 81, of determining whether N pieces of failure information include first information used to indicate a failure in establishing a radio resource control protocol connection may include:

determining whether a quantity of first information included in the N pieces of failure information is greater than or equal to a second threshold, where the second threshold is a positive integer that is not greater than the first threshold; or determining whether the last piece of failure information of the N pieces of failure information is the first information.

In another embodiment, the program, executed by the processor 81, of setting an initiation condition parameter for initiating the mobility management procedure may include:

adjusting preset duration of a timer to first duration shorter than the preset duration, where the timer is used to be started when the quantity N of failures of the initiated mobility management procedure is greater than or equal to the first threshold; and the program, executed by the processor 81, of initiating the mobility management procedure based on the initiation condition parameter may include:

initiating the mobility management procedure when the timer exceeds the first duration.

In this implementation manner, optionally, the program executed by the processor 81 may further include:

when it is determined that the N pieces of failure information include the first information, determining whether a mobility management area to which all cells currently detected by listening belong is the same as a mobility management area in which the device is currently registered; and if yes, triggering the program of adjusting, by the device, preset duration of a timer to first duration shorter than the preset duration; or when it is determined that the N pieces of failure information include the first information, determining whether a mobility management area to which all cells currently detected by listening belong is in a list of mobility management areas in which the device is currently registered; and if yes, triggering the program of adjusting, by the device, preset duration of a timer to first duration shorter than the preset duration.

In another embodiment, the program, executed by the processor 81, of setting an initiation condition parameter for initiating the mobility management procedure may include:

setting an initiation condition parameter that is used to forbid initiation of the mobility management procedure in a first mobility management area in which the device is currently registered; or setting an initiation condition parameter that is used to forbid initiation of the mobility management procedure in a mobility management area in a list of mobility management areas in which the device is currently registered; and the program, executed by the processor 81, of initiating the mobility management procedure based on the initiation condition parameter may include:

performing a cell reselection procedure according to the initiation condition parameter, and initiating the mobility management procedure to the core network entity when the device selects a cell that belongs to a second mobility management area, where the second mobility management area is a mobility management area in which initiation of the mobility management procedure is not forbidden.

In this implementation manner, optionally, the program, executed by the processor 81, of setting an initiation condition parameter that is used to forbid initiation of the mobility management procedure in a first mobility management area in which the device is currently registered may include:

determining whether a target cell exists in a cell currently detected by listening, where a mobility management area to which the target cell belongs is not the first mobility management area, and the target cell meets a cell selection condition; and if yes, setting the initiation condition parameter that is used to forbid the initiation of the mobility management procedure in the first mobility management area.

In this implementation manner, optionally, the program, executed by the processor 81, of setting an initiation condition parameter that is used to forbid initiation of the mobility management procedure in a mobility management area in a list of mobility management areas in which the device is currently registered may include:

determining whether a target cell exists in a cell currently detected by listening, where a mobility management area to which the target cell belongs is not in the list of mobility management areas in which the device is currently registered, and the target cell meets a cell selection condition; and if yes, setting the initiation condition parameter that is used to forbid the initiation of the mobility management procedure in the mobility management area in the list of mobility management areas.

In another embodiment, the program, executed by the processor 81, of setting an initiation condition parameter for initiating the mobility management procedure may include:

adjusting preset duration of a timer to first duration shorter than the preset duration, and setting an initiation condition parameter that is used to forbid initiation of the mobility management procedure in a first mobility management area in which the device is currently registered, where the timer is used to be started when the quantity N of failures of the initiated mobility management procedure is greater than or equal to the first threshold; or adjusting preset duration of a timer to first duration shorter than the preset duration, and setting an initiation condition parameter that is used to forbid initiation of the mobility management procedure in a mobility management area in a list of mobility management areas in which the device is currently registered, where the timer is used to be started when the quantity N of failures of the initiated mobility management procedure is greater than or equal to the first threshold; and the program, executed by the processor 81, of initiating the mobility management procedure based on the initiation condition parameter may include:

performing a cell reselection procedure according to the initiation condition parameter; and when a cell that belongs to a second mobility management area is selected, stopping the timer and initiating the mobility management procedure to the core network entity, where the second mobility management area is a mobility management area in which initiation of the mobility management procedure is not forbidden.

Optionally, in the foregoing embodiment, the program, executed by the processor 81, of setting an initiation condition parameter that is used to forbid initiation of the mobility management procedure in a first mobility management area in which the device is currently registered may include:

adding, to a forbidden list, identification information of the first mobility management area in which the device is currently registered, where the forbidden list is used to record a mobility management area in which the initiation of the mobility management procedure is forbidden, and identification information of the second mobility management area is not recorded in the forbidden list.

Optionally, in the foregoing embodiment, the program, executed by the processor 81, of setting an initiation condition parameter that is used to forbid initiation of the mobility management procedure in a mobility management area in a list of mobility management areas in which the device is currently registered may include:

adding, to a forbidden list, identification information of the mobility management area in the list of mobility management areas in which the device is currently registered, where the forbidden list is used to record a mobility management area in which the initiation of the mobility management procedure is forbidden, and identification information of the second mobility management area is not recorded in the forbidden list.

In this implementation manner, optionally, the program executed by the processor 81 may further include:

deleting the identification information of the first mobility management area from the forbidden list; or deleting the identification information of the mobility management area in the list of mobility management areas from the forbidden list.

In the foregoing technical solution, when a quantity N of failures of a mobility management procedure initiated by a device to a core network entity is greater than or equal to a first threshold, the device determines whether N pieces of failure information include first information used to indicate a failure in establishing a radio resource control protocol connection; when determining that the N pieces of failure information include the first information, the device sets an initiation condition parameter for initiating the mobility management procedure; and the device initiates the mobility management procedure based on the initiation condition parameter. In comparison with the prior art in which a mobility management procedure is not initiated until a timing apparatus expires, in the present invention, the mobility management procedure can be initiated more quickly, so that a network access speed of the device can be improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disc, an optical disc, a read-only memory (Read-Only Memory, ROM), or a random access memory (Random Access Memory, RAM for short).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A mobility management procedure initiation method, comprising:

when a quantity N of failures of a mobility management procedure initiated by a device to a core network entity is greater than or equal to a first threshold, determining, by the device, whether N pieces of failure information comprise first information used to indicate a failure in establishing a radio resource control connection, wherein the N pieces of failure information are failure information obtained from N failures of the mobility management procedure initiated by the device to the core network entity;

when the N pieces of failure information comprise the first information, setting, by the device, an initiation condition parameter for initiating the mobility management procedure, wherein the initiation condition parameter is a condition parameter that the device needs to meet when the mobility management procedure is being initiated; and initiating, by the device, the mobility management procedure based on the initiation condition parameter;

wherein the mobility management procedure is one of a current location registration procedure, a cell handover procedure, a call processing procedure, an attach procedure, a Tracking Area Update procedure, a Routing Area Update procedure, and a Location Area Update procedure;

wherein the setting, by the device, the initiation condition parameter for initiating the mobility management procedure comprises:

adjusting, by the device, a preset duration of a timer to a first duration shorter than the preset duration, and setting the initiation condition parameter that is used to forbid initiation of the mobility management procedure in a mobility management area in a list of mobility management areas in which the device is currently registered, wherein the timer is used to be started when the quantity N of failures of the initiated mobility management procedure is greater than or equal to the first threshold, and wherein the initiating, by the device, the mobility management procedure based on the initiation condition parameter comprises:

performing, by the device, a cell reselection procedure according to the initiation condition parameter; and when the device selects a cell that belongs to a second mobility management area, stopping, by the device, the timer, and initiating the mobility management procedure to the core network entity, wherein the second mobility management area is a mobility management area in which initiation of the mobility management procedure is allowed.

2. The method according to claim 1, wherein before the adjusting, by the device, the preset duration of the timer to the first duration shorter than the preset duration, the method further comprises:

when the N pieces of failure information comprise the first information, determining, by the device, a mobility management area to which all cells currently detected by listening belong being in a list of mobility management areas in which the device is currently registered; and triggering operation of adjusting, by the device, the preset duration of the timer to the first duration shorter than the preset duration.

3. The method according to claim 1, wherein the determining, by the device, whether the N pieces of failure information comprise first information used to indicate the failure in establishing the radio resource control connection comprises:

determining, by the device, whether a quantity of first information comprised in the N pieces of failure information is greater than or equal to a second threshold, wherein the second threshold is a positive integer less than or equal to the first threshold.

4. The method according to claim 1, wherein the setting the initiation condition parameter that is used to forbid initiation of the mobility management procedure in the mobility management area in the list of mobility management areas in which the device is currently registered comprises:

adding, to a forbidden list by the device, identification information of the mobility management area in the list of mobility management areas in which the device is currently registered, wherein the forbidden list is used to record a mobility management area in which the initiation of the mobility management procedure is forbidden, and identification information of the second mobility management area is not recorded in the forbidden list.

5. The method according to claim 4, wherein after the initiating, by the device, the mobility management procedure based on the initiation condition parameter, the method further comprises:

deleting, by the device, the identification information of the mobility management area in the list of mobility management areas from the forbidden list.

6. A device, comprising:
at least one processor; and
a memory communicatively coupled to the at least one processor, wherein
the at least one processor is configured to:
when a quantity N of failures of a mobility management procedure initiated by the device to a core network entity is greater than or equal to a first threshold, determine whether N pieces of failure information comprise first information used to indicate a failure in establishing a radio resource control connection, wherein the N pieces of failure information are failure information obtained from N failures of the mobility management procedure initiated by the device to the core network entity;
when the N pieces of failure information comprise the first information, set an initiation condition parameter for initiating the mobility management procedure, wherein the initiation condition parameter is a condition parameter that the device needs to meet when the mobility management procedure is being initiated; and
initiate the mobility management procedure based on the initiation condition parameter;
wherein the mobility management procedure is one of a current location registration procedure, a cell handover procedure, a call processing procedure, an attach procedure, a Tracking Area Update procedure, a Routing Area Update procedure, and a Location Area Update procedure;
wherein the at least one processor, for setting the initiation condition parameter for initiating the mobility management procedure, is further configured to:
adjust a preset duration of a timer to a first duration shorter than the preset duration, and set the initiation condition parameter that is used to forbid initiation of the mobility management procedure in a mobility management area in a list of mobility management areas in which the device is currently registered, wherein the timer is used to be started when the quantity N of failures of the initiated mobility management procedure is greater than or equal to the first threshold; and
wherein the at least one processor, for initiating the mobility management procedure based on the initiation condition parameter, is further configured to:
perform a cell reselection procedure according to the initiation condition parameter; and
when a cell that belongs to a second mobility management area is selected, stop the timer and initiate the mobility management procedure to the core network entity, wherein the second mobility management area is a mobility management area in which initiation of the mobility management procedure is allowed.

7. The device according to claim 6, wherein the at least one processor is further configured to:
when the N pieces of failure information comprise the first information, determine a mobility management area to which all cells currently detected by listening belong being in a list of mobility management areas in which the device is currently registered; and
adjust the preset duration of the timer to the first duration shorter than the preset duration.

8. The device according to claim 6, wherein the at least one processor, for determining whether N pieces of failure information comprise first information used to indicate the failure in establishing the radio resource control connection, is further configured to:
determine whether a quantity of first information comprised in the N pieces of failure information is greater than or equal to a second threshold, wherein the second threshold is a positive integer less than or equal to the first threshold.

9. The device according to claim 6, wherein the at least one processor, for setting the initiation condition parameter that is used to forbid initiation of the mobility management procedure in the mobility management area in the list of mobility management areas in which the device is currently registered, is further configured to:
add, to a forbidden list, identification information of the mobility management area in the list of mobility management areas in which the device is currently registered, wherein the forbidden list is used to record a mobility management area in which the initiation of the mobility management procedure is forbidden, and identification information of the second mobility management area is not recorded in the forbidden list.

10. The device according to claim 9, wherein the at least one processor is further configured to:
delete the identification information of the mobility management area in the list of mobility management areas from the forbidden list.

11. The method according to claim 1, wherein the determining, by the device, whether the N pieces of failure information comprise first information used to indicate the failure in establishing the radio resource control connection comprises:

determining, by the device, whether a last piece of failure information of the N pieces of failure information is the first information.

12. The device according to claim 6, wherein the at least one processor, for determining whether N pieces of failure information comprise first information used to indicate the failure in establishing the radio resource control connection, is further configured to:

determine whether a last piece of failure information of the N pieces of failure information is the first information.

\* \* \* \* \*